Patented June 8, 1954

2,680,764

UNITED STATES PATENT OFFICE 2,680,764

PREPARATION OF α,β-DICHLOROPROPIONIC ACID ESTERS

William O. Ney, Jr., Somerset Center, Mass., assignor to General Aniline & Film Corporation, New York, N. Y., a corporation of Delaware No Drawing. Application October 30, 1950, Serial No. 193,037

5 Claims. (Cl. 260—487)

This invention relates to a method of preparing esters of α,β-dichloropropionic acid from the corresponding esters of acrylic acid.

Heretofore, the aforesaid α,β-dichloropropionic acid esters were prepared by introducing chlorine into the corresponding acrylic acid ester in the liquid phase, e. g. in the presence of organic diluents and/or chlorine addition catalysts. These processes resulted in substantial losses due to side reactions yielding chlorinated dimers and other by-products. Separation of the α,β-dichloropropionic ester from the resulting reaction mixture was complicated by solvent recovery and was therefore relatively expensive and inconvenient.

It is an object of this invention to provide an improved process for producing α,β-dichloropropionic acid esters by reaction of the corresponding acrylic acid esters with chlorine, wherein greatly improved yields are obtained, side reactions and by-product formation are minimized, the use of solvents or diluents is avoided, recovery of the product is facilitated, and the reaction can be carried out in a continuous manner.

According to my invention, I have found that α,β-dichloropropionic acid esters can be readily prepared in high yields (e. g. 80 to 90% of theory in the case of the methyl ester) by passing the corresponding acrylic acid ester, in contact with chlorine gas, in countercurrent, but preferably concurrent, flow, through a reaction zone in which, preferably, extensive surface contact is maintained between the gaseous and liquid phases, and wherein the maximum temperature is maintained at 40 to 200° C. and preferably 80 to 120° C., the conditions (particularly the pressure) being such as to effect vaporization of most of the acrylic acid ester at the maximum temperature maintained in the reaction zone. The mol ratio of chlorine to the acrylic acid ester passed through said zone can be varied from 0.75 to 3.2, but is preferably between 0.9 and 1.5. No catalyst is required, and the presence of materials catalyzing side reactions or decomposition is preferably avoided. Preferably, a small amount of water is included with the acrylic acid ester, e. g. an amount corresponding to 0.5 to 3% of the ester, to obtain optimum yields. It is also desirable to include a small amount of a polymerization inhibitor such as hydroquinone or p-tertiary butyl catechol in the acrylic ester to prevent polymerization thereof.

Under the conditions outlined above, most of the acrylic acid ester is vaporized in the reaction zone, and chlorine addition occurs largely as a vapor phase reaction. The reaction mixture recovered from the reaction zone, e. g. by cooling, yields a liquid from which unreacted acrylic ester can be readily recovered by distillation and recycled to the reaction zone, while the α,β-dichloropropionic acid ester can be recovered in pure form by simple fractionation or steam distillation.

The reaction is conveniently carried out in a packed column of glass or other ceramic material containing a packing of similar materials. The acrylic acid ester is allowed to flow downward over the packing on which it is exposed to chlorine simultaneously passed through the column, preferably in a concurrent direction. Since the reaction is exothermic, the desired maximum temperature can ordinarily be attained without supplying additional heat. However, in appropriate cases, the column can be equipped with a jacket or similar device for circulating a cooling medium in order to maintain the temperature within the desired limits, or with a heating medium if the desired reaction temperature is not attained from the heat of the reaction.

Acrylic esters suitable for treatment in accordance with this process are those which can be vaporized without decomposition at the temperatures attained in the reaction zone. These include especially the acrylic acid esters of monohydroxyhydrocarbons of the saturated aliphatic and cycloaliphatic series, and of the aryl- (saturated)-aliphatic and aromatic series, for example, the acrylic esters of methanol, ethanol, butanol, octanol, dodecanol, octadecanol, cyclohexanol, methyl cyclohexanol, benzyl alcohol, phenol, and cresol.

The process of this invention is illustrated in the following examples, wherein parts are by weight unless otherwise specified.

*Example 1*

325 grams per hour of methyl acrylate, stabilized by 0.25% hydroquinone and containing 1.5% of water, and chlorine at the rate of 387 grams per hour, were introduced at the top of a vertical glass column 2 inches in diameter and 2½ feet long, packed with glass fiber, having at its base a receiver heated at methyl acrylate reflux temperature (80 to 90° C.), and an outlet for exhaust gases. The column was operated without a jacket, and the maximum temperature attained therein was 130 to 135° C., the temperature adjacent the inlet and outlet being, respectively, 115° and 79° C. As the mixture passed downward through the column, a liquid product collected in the receiver at the rate of 550 grams per hour, having a specific gravity of 1.275 and a refraction index ($N_D^{25}$) of 1.4486. On fractional distillation of this product, 0.711 mol of methyl α,β-dichloropropionate ($N_D^{25}$=1.4506) and 0.175 mol of unreacted methyl acrylate were recovered per mol of methyl acrylate introduced into the column. The yield of methyl α,β-dichloropropionate was thus 86.2% of theory.

Example 2

313 grams per hour of moist methyl acrylate, stabilized with 0.25% hydroquinone, and 696 grams per hour of chlorine were introduced at the top of a glass column 2 inches in diameter and 8 feet long, packed with glass fiber, having a jacket through which cooling water at an initial temperature of 27° C. was circulated at the rate of 25.5 liters per hour. A collector vessel and an exit for exhaust gases were provided as in the preceding example, at the base of the column. The maximum temperature attained in the column during operation was 105.5° C., the inlet and outlet temperatures being, respectively 44° and 30° C. The temperature of the effluent cooling water was 35° C. A liquid product was collected at the base of the column at the rate of 563 grams per hour, having a specific gravity of 1.335 and an index of refraction ($N_D^{25}$) of 1.4550. On fractional distillation, the product yielded 0.782 mol of methyl α,β-dichloropropionate and 0.078 mol of unreacted methyl acrylate per mol of methyl acrylate introduced into the column. This corresponds to a yield of 89.4% of theory.

Increasing the proportion of water to as high as 15% of methyl acrylate has no substantial effect on the yield. Similarly, dilution with inert diluents such as nitrogen, methanol, cyclohexene and benzene has no appreciable effect on the reaction. Countercurrent flow of chlorine lowers the yield, e. g. to about 60 to 70%, and results in the formation of larger amounts of high boiling side reaction products. Hence, concurrent flow of chlorine and the acrylic acid ester is preferred.

Instead of methyl acrylate employed in the foregoing example, other acrylic acid esters, such as methyl, ethyl, n-butyl or isobutyl, cyclohexyl, methylcyclohexyl, benzyl, phenyl, and cresyl acrylates can be similarly converted to the corresponding α,β-dichloropropionates.

Pressure maintained in the reaction zone can be atmospheric or above or below atmospheric pressure, although superatmospheric pressure, exceeding that caused by the back-pressure of the apparatus, is unnecessary. Subatmospheric pressures can be used to insure adequate volatilization of the acrylic ester at the maximum temperature attained in the reaction zone. Ordinarily, however, sufficient volatilization takes place at atmospheric pressure and without operating under reduced pressures.

As illustrated in the examples, the ester can be conveniently introduced in liquid form, allowing vaporization to occur in the reaction zone. However, the ester can also be introduced into the column in the form of a vapor. While the maximum temperature, as illustrated in the examples, is preferably from 40 to 150° C., higher temperatures up to 200° C. can be used, especially in the case of higher boiling acrylic esters.

Other variations and modifications, which will be obvious to those skilled in the art, can be made in the process as illustrated above, without departing from the scope of the invention.

I claim:

1. A process for the preparation of an ester of α,β-dichloropropionic acid, which comprises mixing chlorine with the corresponding ester of acrylic acid in the vapor phase, at a temperature from 40 to 200° C., and recovering α,β-dichloropropionic ester from the resulting reaction mixture.

2. A process for the preparation of an ester of α,β-dichloropropionic acid, which comprises passing chlorine and the corresponding ester of acrylic acid, in a mol ratio of 0.75 to 3.0, through a reaction zone in which the maximum temperature is maintained within the range of 40 to 200° C. and the acrylic ester is vaporized, and recovering α,β-dichloropropionic ester from the mixture issuing from said reaction zone.

3. A process for the preparation of an ester of α,β-dichloropropionic acid, which comprises passing chlorine and the corresponding ester of acrylic acid in a mol ratio of 0.9 to 1.50, concurrently through a reaction zone in which the maximum temperature is maintained within the range of 40 to 200° C. and the acrylic ester is vaporized, and recovering α,β-dichloropropionic ester from the mixture issuing from said reaction zone.

4. A process for the preparation of methyl α,β-dichloropropionate, which comprises passing chlorine and methyl acrylate in a mol ratio of 0.9 to 1.50 concurrently through a reaction zone in which the maximum temperature is maintained within the range of 80 to 120° C. and the methyl acrylate is vaporized, and recovering methyl α,β-dichloropropionate from the mixture issuing from the reaction zone.

5. A process for the preparation of an ester of α,β-dichloropropionic acid, which comprises flowing the corresponding acrylic acid ester downward through a packed column, introducing a concurrent stream of chlorine gas into said column in a mol ratio relative to the acrylic acid ester of 0.9 to 1.50, maintaining a maximum temperature in the column within the range of 80 to 120° C., and a pressure at which the acrylic acid ester vaporizes at said temperature, and recovering the α,β-dichloropropionic acid ester from the effluent at the base of the column.

References Cited in the file of this patent

UNITED STATES PATENTS

| Number | Name | Date |
|---|---|---|
| 2,320,034 | D'Ianni | May 25, 1943 |

OTHER REFERENCES

Marvel et al.: J. Am. Chem. Soc., vol. 62, pp. 3495–3498 (1940).